United States Patent

Underwood

(10) Patent No.: US 7,578,416 B2
(45) Date of Patent: Aug. 25, 2009

(54) WATER PURIFICATION APPARATUS

(75) Inventor: Lee Underwood, High Wycombe (GB)

(73) Assignee: OTV SA, Cedex (FR)

(*) Notice: Subject to any disclaimer, the term of this patent is extended or adjusted under 35 U.S.C. 154(b) by 492 days.

(21) Appl. No.: 10/507,166

(22) PCT Filed: Mar. 7, 2003

(86) PCT No.: PCT/GB03/00985

§ 371 (c)(1),
(2), (4) Date: Sep. 9, 2004

(87) PCT Pub. No.: WO03/078328

PCT Pub. Date: Sep. 25, 2003

(65) Prior Publication Data

US 2005/0127115 A1 Jun. 16, 2005

(30) Foreign Application Priority Data

Mar. 13, 2002 (GB) ................................ 0205893.1

(51) Int. Cl.
*B67D 5/58* (2006.01)
(52) U.S. Cl. ............................. 222/190; 222/1; 222/55; 222/129.4; 222/145.5; 222/189.06; 222/145.7; 222/318; 210/650; 210/677; 210/900
(58) Field of Classification Search ............... 222/1, 222/52, 55–56, 318, 109, 189.06, 190, 144.5, 222/145.1, 145.5, 71, 145.6, 145.7, 129.2, 222/129.3, 129.4; 210/650, 677, 900
See application file for complete search history.

(56) References Cited

U.S. PATENT DOCUMENTS 3,873,004 A * 3/1975 Feild ........................... 222/135
3,991,911 A * 11/1976 Shannon et al. .............. 222/25
4,204,956 A * 5/1980 Flatow ......................... 210/87
4,372,352 A * 2/1983 Coppola et al. .............. 141/1
4,610,790 A 9/1986 Reti et al.
4,720,800 A 1/1988 Suzuki et al.
4,741,355 A * 5/1988 Credle et al. ............... 137/269
4,876,653 A * 10/1989 McSpadden et al. ........ 700/239
5,032,265 A 7/1991 Jha et al.
5,152,252 A 10/1992 Bolton et al.

(Continued)

FOREIGN PATENT DOCUMENTS

EP 1136447 9/2001

(Continued)

*Primary Examiner*—Frederick C. Nicolas
(74) *Attorney, Agent, or Firm*—Drinker Biddle & Reath LLP

(57) ABSTRACT

A water purification apparatus having an inlet and an outlet, and at least one water purification device thereinbetween, wherein the outlet includes at least a first and second water release valve, the first release valve being operable at a first flow rate, and the second release valve being operable at a second flow, is described. Preferably, at least one water release valve is operable at a relatively slow flow rate of generally up to 0.1 liter per minute, and at least one other water release valve is operable at a relatively fast flow rate of, for example, up to 2 liters per minute. The present water purification apparatus provides the operator with the ability to very accurately obtain an exact volume of water desired.

25 Claims, 1 Drawing Sheet

U.S. PATENT DOCUMENTS

| | | |
|---|---|---|
| 5,276,432 A | 1/1994 | Travis |
| 5,294,916 A | 3/1994 | Bolton et al. |
| 5,296,655 A | 3/1994 | Sargent et al. |
| 5,606,516 A | 2/1997 | Douglas et al. |
| 5,817,231 A | 10/1998 | Souza |
| 5,868,924 A | 2/1999 | Nachtman et al. |
| 5,918,773 A * | 7/1999 | Donovan et al. ......... 222/146.6 |
| 5,925,240 A | 7/1999 | Wilkins et al. |
| 5,935,441 A | 8/1999 | O'Neill et al. |
| 5,980,716 A | 11/1999 | Horinouchi et al. |
| 6,101,452 A | 8/2000 | Krall et al. |
| 6,240,829 B1 * | 6/2001 | McGarrah ................. 99/275 |
| 6,245,224 B1 * | 6/2001 | Enoki et al. ................. 210/87 |
| 6,328,881 B1 * | 12/2001 | Larkner et al. ................. 210/87 |
| 6,355,177 B2 * | 3/2002 | Senner et al. ............... 210/739 |
| 6,374,845 B1 * | 4/2002 | Melendez et al. ............. 137/3 |
| 6,579,445 B2 | 6/2003 | Nachtman et al. |

FOREIGN PATENT DOCUMENTS

| | | |
|---|---|---|
| WO | 0119957 | 3/2001 |

* cited by examiner

WATER PURIFICATION APPARATUS

FIELD OF THE INVENTION

The present invention relates to the control of dispensing of water from water purification apparatus and units, particularly but not exclusively for laboratory water.

BACKGROUND

Water purification units for use in laboratories have been devised that remove levels of contaminants to very low levels. They typically contain a variety of technologies that remove particles, bacteria, ionic species and organic molecules. Water is recirculated within the unit to maintain the highest purity. When a user has required water he has typically opened a valve to dispense the amount of water required. A user will typically open the valve fully at first and partially close the valve as the amount of water dispensed approaches that required. This allows the user to make sure the amount of water does not exceed fill lines typically found on laboratory equipment.

U.S. Pat. No. 5,925,240 discloses an improved system of controlling the water output of the unit by varying the pump speed and/or the outlet valve's cross section in conjunction with a timer to give a desired amount of water. Both the pump and the valve can introduce an inaccuracy into the amount dispensed. Pump speed is typically controlled by reducing the voltage applied to the pump and correlation between this voltage and water output can vary depending upon inlet water pressure, temperature, back pressure and any gas hold up. Valve throughput can also be affected by pressure and temperature.

WO 01/27798 A discloses the use of a flow sensor to determine the amount of water dispensed by a deionization system and charge accordingly. It also includes a safety feature wherein the flow is halted if readings from the flow and pressure sensors indicate a missing/failed nozzle.

EP 1134190A discloses a sensor fitted to a laboratory water purification unit which measures how much water has passed through the unit. A controller changes the pump speed between two speeds and opens a dispense valve to dispense an amount of water input into the units controller by the user.

SUMMARY OF THE INVENTION

It is an object of the present invention to provide an improved control of water dispensing from a small scale, e.g. laboratory, water purification apparatus or unit.

Thus, according to one aspect of the present invention, there is provided a water purification apparatus having an inlet and an outlet, and at least one water purification means thereinbetween, wherein the outlet includes at least a first release means and a second water release means, the first release means being operable at a first flow rate, and the second release means being operable at a second flow rate.

The outlet may include further water release means. One suitable release means is a valve.

Thus, the rate of release of water through the outlet can be controlled by a first flow rate, or a second flow rate, or a combination thereof; or further separate or conjoined flow rates if further water release means are used.

The flow rate of each water release means could be the same or different to the flow rate of every other water release means. Preferably, the first flow rate is different to the second flow rate.

In one embodiment of the present invention, the water release means operate in parallel. Two or more means could in addition or alternatively operate in series.

In another embodiment of the present invention, the water release means provide alternative flow paths for water through the outlet.

In yet a further embodiment of the present invention, each water release means is independently controllable from every other water release means.

Preferably, at least one water release means is operable at a relatively slow flow rate of generally up to 0.1 litre per minute, although this could of course be greater, for example up to 1.0 litre per minute, and at least one other water release means is operable at a relatively fast flow rate of, for example, up to 2 litres per minute.

Preferably, the operation and/or flow rate of at least one water release means is wholly or substantially dependant upon the operation and/or flow rate through at least one other water release means. More preferably, operation of a 'faster' flow rate water means is dependent upon operation of a relatively slow flow rate water release means.

In a further embodiment of the present invention, the water release means are operable manually and/or automatically, and either separately or independently.

In one arrangement, the apparatus includes a control means for controlling the outlet flow and/or flow rate through all the release means. For example operation of the control means opens a first, preferably 'slow' rate means, followed after a reasonable time period or flow by opening of a second 'fast' rate means. This arrangement could be reversed at or near the end of the desired outflow.

More preferably, the degree of operation of each water release means is dependent upon the amount or volume of water to be dispensed through the outlet.

Preferably, the apparatus includes one or more water pumps. The or each pump may be separately or integrally linked with one or more of the water release means, or at least to the means for controlling the water release through the outlet.

In a further embodiment of the present invention, the apparatus includes a recirculation system to provide recirculation around at least part of the apparatus of any water treated by the or one of the water purification means, but not immediately required by the outlet. Such a recirculation unit may include one or more pressure-sustaining means such as non-return valves to maintain outlet pressure.

The apparatus may include one or more alarm means, such as a visual and/or aural alert, to provide a signal for confirmation and/or feedback to the operator of the flow rate of the outlet, and/or the flow rate of one or more of the water release means.

The apparatus of the present invention may provide for the dispensing of water by any suitable arrangement based on time, volume, etc. Preferably, the apparatus of the present invention allows the operator to pre-set the volume of desired water to be dispensed, and the apparatus automatically operates the or each relevant water release means to provide a controlled (but usually variable) flow rate.

According to a second aspect of the present invention, there is provided a method for dispensing water from a water purification apparatus having an inlet, an outlet, and at least one water purification means thereinbetween, the outlet including at least two water release means, a first release means being operable at a first flow rate, and at least a second water release means being operable at a second flow rate, wherein an operator organises the dispense of water from the outlet through at least one of the water release means.

The present water purification apparatus provides the operator with the ability to very accurately obtain an exact volume of water desired.

Where the apparatus includes a control means, possibly with an associated control switch or button, the user can preferably set the volume or amount of water desired, and the apparatus automatically controls the release means, and any included pump(s), to provide said amount exactly. The control means can be pre-programmed to calculate the precise rate of flow required through the or each relevant release means.

Preferably, at least one of the water release means provides a relatively slow flow rate, particularly, but not exclusively, useable at the beginning and end of a water dispensing operation, whilst the second water release means provides water at a fast flow rate, and is generally more used during the middle of the operation for dispersement of water.

BRIEF DESCRIPTION OF THE DRAWINGS

An embodiment of the present invention will now be described by way of example only and with reference to the accompanying FIG. 1, being a block-flow diagram of operation of an apparatus according to one embodiment of the present invention.

DETAILED DISCUSSION OF THE DRAWINGS

Figure 1:
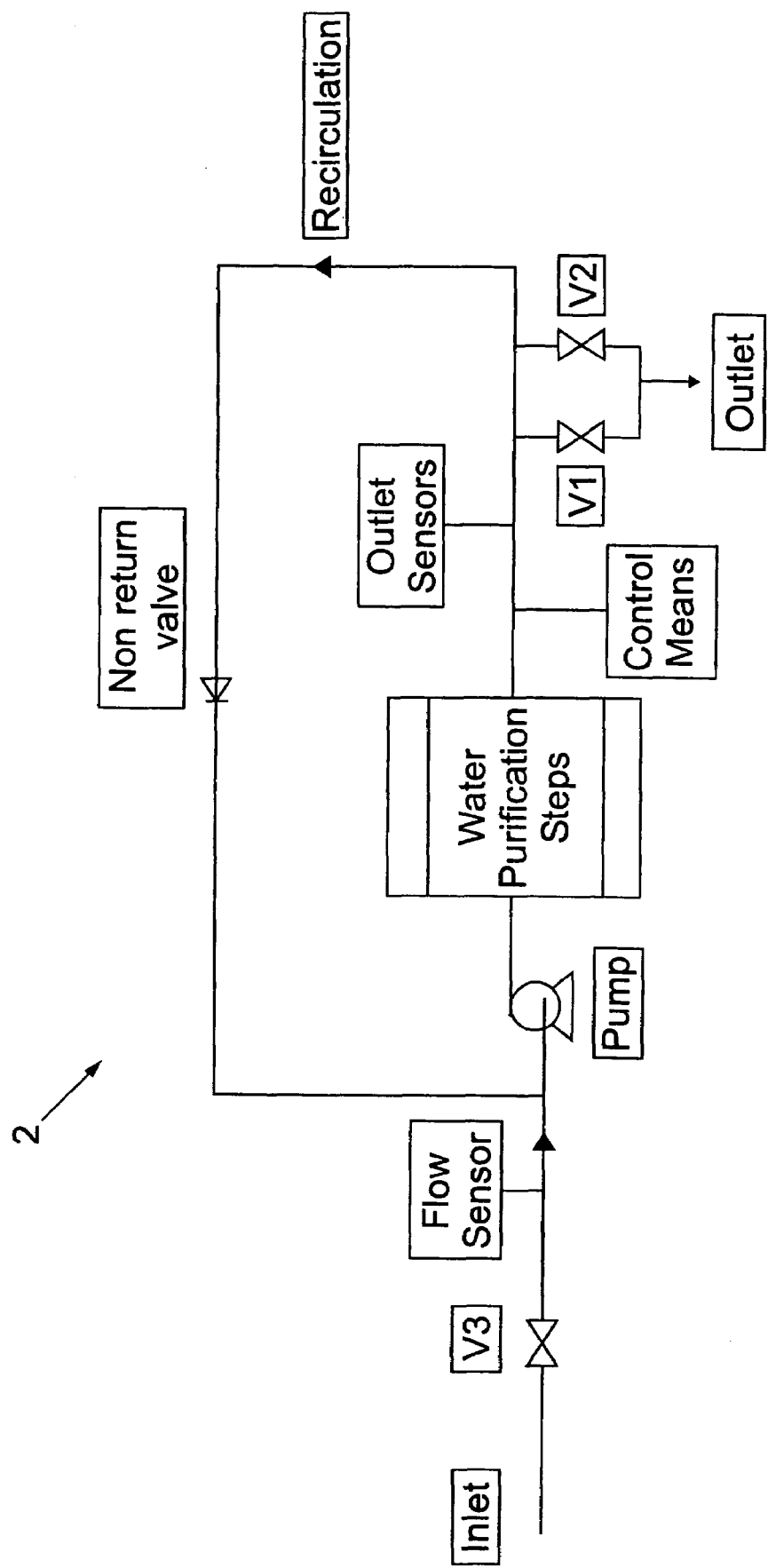

Referring to the drawing, a unit 2 operates with feedwater being drawn into the unit 2 via an inlet and a solenoid valve, V3. The water passes through a series of purification steps and past sensors for temperature and resistivity before being dispensed to an outlet via two release valves V1 and V2.

When water is not required, the pump recirculates the water to be purified through the purification steps maintaining it at the highest quality possible. A non return valve is included in the recirculation tubing to both prevent bypass of water to the outlet valves V1 and V2 without it passing through the purification steps, and also to provide a system pressure at which the water can be dispensed.

Water can be dispensed by turning a switch (not shown), which firstly, opens the low flow, trickle valve V2. This will dispense dropwise initially with an audible 'click' for each drop dispensed. As the switch is turned the drops and associated 'clicks' increase in rate, until the unit 2 dispenses a low continuous flow. On further turning, the unit opens the larger valve V1 increasing the dispense rate. On yet further turning the pump speed is increased causing water to be dispensed at a rate up to the maximum flowrate of for example two litres per minute. Pushing the switch closes the valves and reduces the pump speed. When dispensing, water is drawn into the unit via V3. When not dispensing, or when dispensing at a low rate, the unrequired water is recirculated around the loop.

When the operator wishes to dispense a fixed volume of purified water, he will input the amount, from, for example, 0.1 to 60 litres, via an operator interface on the unit 2 (not shown). When ready, the unit will open the valves V1 and V2 and increase pump speed as appropriate to the volume being dispensed. Water will be drawn into the unit via V3 and the flow sensor will transmit the rate of flow to the processor via a series of pulses. The processor will integrate the pulses and from this determine the amount of water dispensed. When the amount of water dispensed approaches the amount specified by the operator, the pump will slow down followed by valve V1 closing and finally valve V2 closing. The pump will continue to recirculate water around the loop.

The use of the two valves and variation in pump speed allows a more controlled outlet measure as the amount of water approaches that required. As the water reaches the fill point of the vessel being filled, then the user is still able to stop the dispense without excessive water dispense. The user may also be able to reduce the flow by turning the switch in the opposite direction so that a slow drip is dispensed as the water level approaches the fill line typically found on glassware.

The invention claimed is:

1. A laboratory water purification apparatus for accurately dispensing purified laboratory water having an inlet and an outlet, and at least one water purification means thereinbetween, wherein the outlet includes at least a first water release valve and a second water release valve, the first water release valve being operable at a first flow rate to dispense purified water, and the second water release valve being operable at a second flow rate to dispense purified water, the first flow rate differing from the second flow rate, the first water release valve and the second water release valve being connected to a common purified water feed that is connected to the at least one purification means, the common feed for supplying said purified water from the at least one purification means to the first and second water release valves; wherein the first water release valve and second water release valve combine their flows prior to dispense of a flow of said purified water from the outlet; wherein at least one water release valve is operable at a relatively slow flow rate and at least one other water release valve is operable at a relatively fast flow rate.

2. A laboratory water purification apparatus as claimed in claim 1, wherein the outlet includes further water release valve.

3. A laboratory water purification apparatus as claimed in claim 1, wherein the rate of release of the purified water though the outlet is controlled by the first flow rate, or the second flow rate, or a combination thereof.

4. A laboratory water purification apparatus as claimed in claim 1, wherein the water release valves operate in parallel.

5. A laboratory water purification apparatus as claimed in claim 1, wherein the water release valves provide alternative flow paths for the purified water through the outlet.

6. A laboratory water purification apparatus as claimed in claim 1, wherein each water release valve is independently controllable from the or every other water release valve.

7. A laboratory water purification apparatus as claimed in claim 1, wherein the at least one water release valve is operable at a relatively slow flow rate of up to 0.1 liters per minute, the at least one water release valve is operable at a relatively fast flow rate of up to 2 liters per minute.

8. A laboratory water purification apparatus as claimed in claim 1, wherein operation of and/or flow rate of at least one water release valve is wholly or substantially dependent upon operation of and/or flow rate though at least one other water release valve.

9. A laboratory water purification apparatus as claimed in claim 1, wherein the apparatus includes one or more water pumps.

10. A laboratory water purification apparatus as claimed in claim 9, wherein the or each pump is linked with one or more of the water release valve.

11. A laboratory water purification apparatus as claimed in claim 1, wherein the water release valves are operable automatically.

12. A laboratory water purification apparatus as claimed in claim 1, wherein the apparatus includes a control means for controlling the outlet flow and flow rate through all the water release valves.

13. A laboratory water purification apparatus as claimed in claim 12, wherein the control means is pre-programmed to calculate the rate of flow through each water release valves.

14. A laboratory water purification apparatus as claimed in claim 1, wherein a degree of operation of each water release valve is dependent upon an amount or volume of said purified water to be dispensed through the outlet.

15. A laboratory water purification apparatus as claimed in claim 1, wherein the apparatus includes a recirculation system to provide recirculation around at least a part of the apparatus of any water treated by the or each water purification means.

16. A laboratory water purification apparatus as claimed in claim 1, wherein the apparatus includes one or more alarm means to provide a signal concerning the flow rate of the outlet and/or the flow rate of one or more of the water release valves.

17. A laboratory water purification apparatus as claimed in claim 1, adapted to provide a pre-set volume of purified water by automatic operation of one or each relevant water release valves.

18. A laboratory water purification apparatus as claimed in claim 1, wherein the common purified water feed is a recirculation line that leads from an outlet of the at least one purification means and connects to an inlet line leading into the at least one purification water means, and wherein the first and second water release valves connect to the recirculation line prior its connection to the inlet line.

19. A laboratory water purification apparatus for accurately dispensing purified laboratory water having an inlet and an outlet, and at least one water purification means thereinbetween, wherein the outlet includes at least a first water release valve and a second water release valve, the first water release valve being operable at a first flow rate to dispense purified water, and the second water release valve being operable at a second flow rate to dispense purified water, the first flow rate differing from the second flow rate; wherein the first water release valve and second water release valve combine their flows prior to dispense of a flow of purified water from the outlet; wherein at least one water release valve is operable at a relatively slow flow rate and at least one other water release valve is operable at a relatively fast flow rate, wherein operation of the relatively fast flow rate water release valve is dependent upon operation of the relatively slow flow rate water release valve.

20. A laboratory water purification apparatus for accurately dispensing purified laboratory water having an inlet and an outlet, and at least one water purification means thereinbetween, wherein the outlet includes at least a first water release valve and a second water release valve, the first water release valve being operable at a first flow rate to dispense purified water, and the second water release valve being operable at a second flow rate to dispense purified water, the first flow rate differing from the second flow rate; wherein the first water release valve and second water release valve combine their flows prior to dispense a flow of purified water from the outlet, wherein the apparatus includes a recirculation system to provide recirculation around at least a part of the apparatus of any water treated by the or each water purification means, wherein the recirculation unit includes one or more pressure-sustaining means to maintain outlet pressure.

21. A method for accurately dispensing purified laboratory water from a laboratory water purification apparatus having an inlet and an outlet, and at least one water purification means thereinbetween, the outlet including at least a first water release valve and a second water release valve, the first water release valve and the second water release valve being connected to a common purified water feed that is connected to the at least one purification means, the common feed supplying purified water from the at least one purification means to the first and second water release valves, the first water release valve being operable at a first flow rate to dispense purified water, and the second water release valve being operable at a second flow rate to dispense purified water, the first flow rate differing from the second flow rate; wherein the flow from the first water release valve and the flow from the second water release valve combine prior to the dispense of purified water from the outlet.

22. A method of dispensing water as claimed in claim 21, wherein the dispense of purified water from the outlet is controlled through at least one of the water release valve.

23. A method of dispensing water as claimed in claim 21, wherein the apparatus includes a pump which is automatically controlled by a control means.

24. A method of dispensing water as claimed in claim 21, wherein the purified water is provided by the first water release valve having a relatively fast flow rate followed by the second water release valve having a relatively slow flow rate.

25. A method for accurately dispensing purified laboratory water from a laboratory water purification apparatus having an inlet and an outlet, and at least one water purification means thereinbetween, the outlet including at least a first water release valve and a second water release valve, the first water release valve being operable at a first flow rate to dispense purified water, and the second water release valve being operable at a second flow rate to dispense purified water, the first flow rate differing from the second flow rate; wherein the flow from the first water release valve and the flow from the second water release valve combine prior to the dispense of purified water from the outlet, the apparatus including a pump which is automatically controlled by a control means, wherein the second water release valve provides an initial relatively slow dispensement prior to the dispensement from the first water release valve.

* * * * *